United States Patent
Kim et al.

(10) Patent No.: US 10,260,581 B2
(45) Date of Patent: Apr. 16, 2019

(54) BRAKE DISC

(71) Applicants: Hyundai Motor Company, Seoul (KR); Kia Motors Corporation, Seoul (KR); SEOHAN INDUSTRY CO., LTD., Jincheon-gun (KR)

(72) Inventors: Yoon Cheol Kim, Suwon-si (KR); Seong Jin Kim, Seongnam-si (KR); Jai Min Han, Suwon-si (KR); Joo Beom Kim, Andong-si (KR); Soo Hyuk Lee, Seoul (KR); Jae Young Lee, Yongin-si (KR); Byung Soo Yoo, Incheon (KR); Tae Ho Jung, Anyang-si (KR); Min Gyun Chung, Seongnam-si (KR); Byung Chan Lee, Suwon-si (KR); Yoon Joo Rhee, Suwon-si (KR); Sang Do Kwak, Suwon-si (KR); Gwang Yun Kim, Ansan-si (KR); Taeg Jo Kim, Seoul (KR); Cheol Ki Kim, Suwon-si (KR); O Sung Kwon, Yongin-si (KR); Kyoung Don Yi, Suwon-si (KR); Jae Seok Lee, Hwaseong-si (KR)

(73) Assignees: Hyundai Motor Company, Seoul (KR); Kia Motors Corporation, Seoul (KR); SEOHAN INDUSTRY CO., LTD., Jincheon-gun (KR)

( * ) Notice: Subject to any disclaimer, the term of this patent is extended or adjusted under 35 U.S.C. 154(b) by 0 days.

(21) Appl. No.: 15/614,186

(22) Filed: Jun. 5, 2017

(65) Prior Publication Data

US 2018/0156288 A1    Jun. 7, 2018

(30) Foreign Application Priority Data

Dec. 1, 2016  (KR) .......................... 10-2016-0162542

(51) Int. Cl.
  *F16D 65/02* (2006.01)
  *F16D 65/12* (2006.01)

(52) U.S. Cl.
  CPC .... *F16D 65/125* (2013.01); *F16D 2065/1304* (2013.01); *F16D 2065/136* (2013.01);
  (Continued)

(58) Field of Classification Search
  CPC ....... F16D 2250/0007; F16D 2250/003; F16D 2250/0023; F16D 2065/1316;
  (Continued)

(56) References Cited

U.S. PATENT DOCUMENTS 6,135,247 A * 10/2000 Bodin ............... F16D 65/12
  188/218 XL
2005/0056498 A1   3/2005 Gripemark et al.
  (Continued)

FOREIGN PATENT DOCUMENTS

JP    4125783 B2    7/2008
JP    2009-168251 A    7/2009
  (Continued)

*Primary Examiner* — Robert A. Siconolfi
*Assistant Examiner* — San M Aung
(74) *Attorney, Agent, or Firm* — Morgan, Lewis & Bockius LLP (57) ABSTRACT

Disclosed is a brake disc for vehicles including a ring-shaped disc part provided with an insertion space formed at the central region thereof, a hub part disposed within the insertion space and provided with recesses formed on the external circumferential surface thereof, and connection parts configured to connect the disc part and the hub part, wherein each of the connection parts is divided into a curved section extending from the internal circumferential surface of the disc part and having both curved side surfaces and a rectilinear section extending from the curved section, having both flat side surfaces and inserted into each of the recess, (Continued)

and widths of the curved section and the rectilinear section are decreased in a direction toward the hub part.

7 Claims, 5 Drawing Sheets

(52) U.S. Cl.
CPC ............... *F16D 2065/1376* (2013.01); *F16D 2065/1384* (2013.01); *F16D 2200/003* (2013.01); *F16D 2200/0013* (2013.01)

(58) Field of Classification Search
CPC ..... F16D 2065/1314; F16D 2065/1368; F16D 2065/1388; F16D 2065/1328; F16D 2065/136; F16D 2065/1356; F16D 2065/1384; F16D 2065/1304; F16D 2065/1364; F16D 2065/1376; F16D 2065/1308; F16D 2065/1392; F16D 2065/1378; F16D 65/123; F16D 65/128; F16D 65/092; F16D 65/12; F16D 2200/003; F16D 2200/0013; F16D 2200/0017; F16D 13/38; F16D 1/06; F16D 3/06; F16D 2001/103; F16H 55/08; B60B 27/00; B60B 27/0052; B60B 37/10; Y10T 403/7035

USPC ............................... 188/218 XL, 71.1, 251 A
See application file for complete search history.

(56) References Cited

U.S. PATENT DOCUMENTS

| | | | |
|---|---|---|---|
| 2006/0260889 A1* | 11/2006 | Gripemark | F16D 65/12 188/218 XL |
| 2008/0006492 A1* | 1/2008 | Stensson | F16D 65/123 188/218 XL |
| 2008/0011561 A1* | 1/2008 | Hopkins | F16D 65/12 188/18 A |
| 2013/0001029 A1* | 1/2013 | Visca | F16D 65/12 188/234 |

FOREIGN PATENT DOCUMENTS

| | | |
|---|---|---|
| JP | 5902200 B2 | 4/2016 |
| KR | 10-2015-0061665 A | 6/2015 |
| WO | WO 97/06965 A1 | 2/1997 |
| WO | WO 2012/107068 A1 | 8/2012 |

* cited by examiner

BRAKE DISC

CROSS-REFERENCE TO RELATED APPLICATIONS

The present application claims priority to Korean Patent Application No. 10-2016-0162542, filed on Dec. 1, 2016, the entire contents of which is incorporated herein for all purposes by this reference.

BACKGROUND OF THE INVENTION

Field of the Invention

The present invention relates to a brake disc and, more particularly, to a brake disc manufacturing by combining different kinds of materials.

Description of Related Art

In general, a brake disc applied to vehicles includes a hub part connected to a drive shaft and a disc part contacting a friction material.

The disc part substantially generates frictional force and thus converts kinetic energy into thermal energy and thus requires high heat resistance and abrasion resistance and, for the present purpose, the disc part may be formed of cast iron.

However, cast iron is based on iron and thus has a high density and is heavy.

Therefore, to reduce the weight of the brake disc, weight reduction technology, in which a disc part directly generating friction is formed of cast iron and a hub part to connect the disc part to a drive shaft is formed of an aluminum alloy, has been developed.

However, since it is difficult to execute surface junction between cast iron and an aluminum alloy by welding, a method of structurally combining a disc part and a hub part formed of cast iron and the aluminum alloy with each other using protrusions and recesses has been used.

That is, a disc part formed of cast iron is manufactured to have a ring shape, a hub part is formed by injecting molten aluminum to surround connection parts protruding from the inner circumferential surface of the disc part and, thereby, the disc part and the hub part formed of different kinds of materials may be combined integrally with each other.

Figure 1:
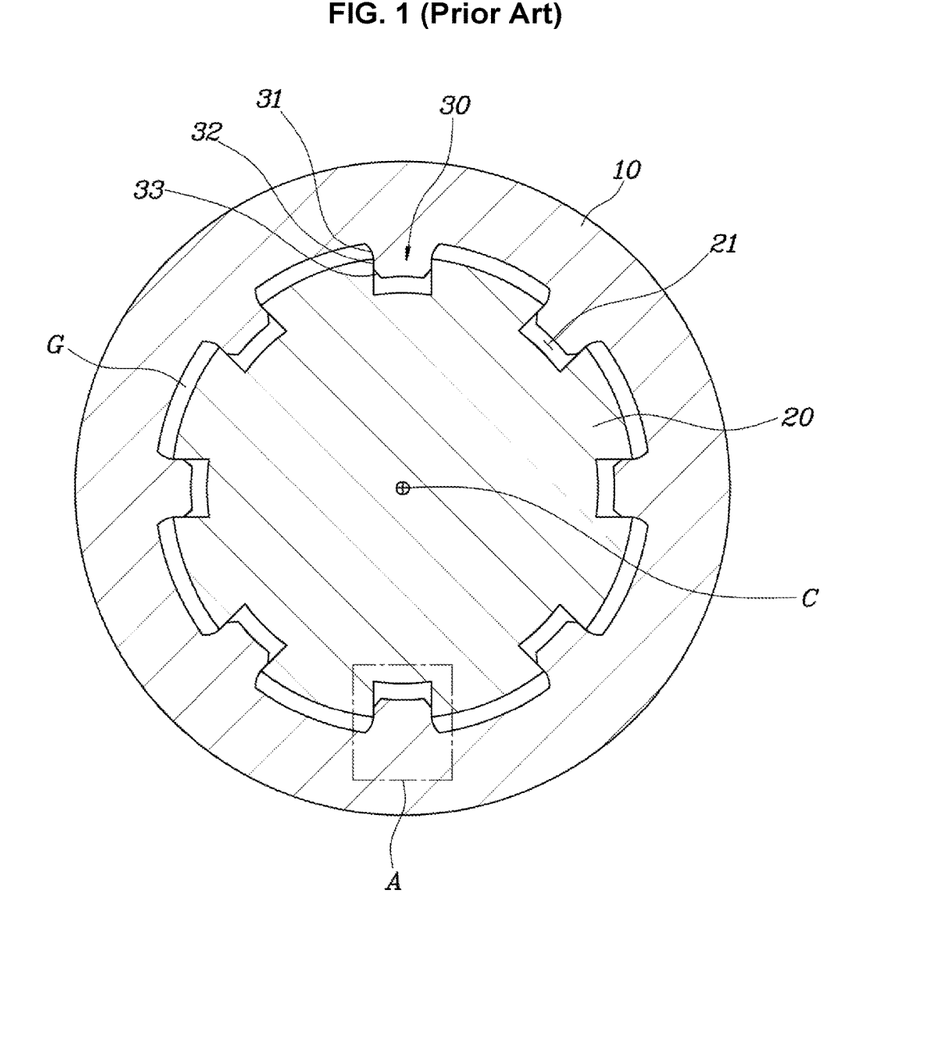
FIG. 1 is a cross-sectional view of a conventional brake disc.
Figure 2:
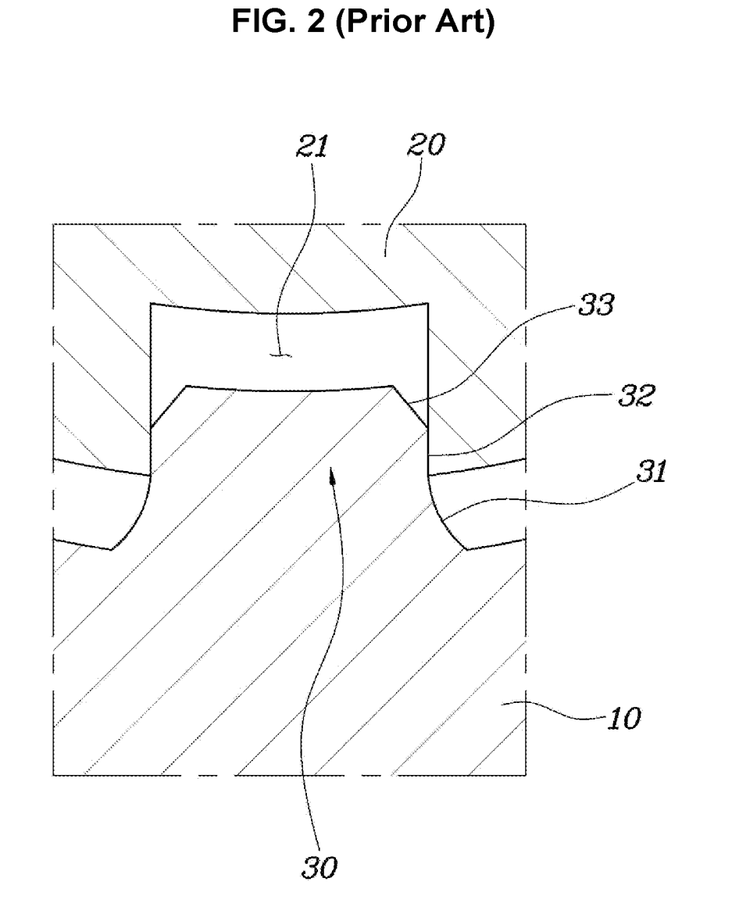
FIG. 2 is an enlarged cross-sectional view of a portion A of the conventional brake disc.

FIG. 1 and FIG. 2 illustrate a conventional structure of combining a disc part and a hub part with each other. As shown in FIG. 1 and FIG. 2, a disc part 10 and a hub part 20 are combined into one body to be rotatable by inserting connection parts 30 protruding from the inside circumferential surface of the disc part 10 into recesses 21 of the hub part 20.

Here, the connection part 30 is divided into a curved section 31 extending from the inside circumferential surface of the disc part 10, a parallel section 32 extending from the end of the curved section 31, and an inclined section 33 extending from the end of the parallel section 32.

The curved section 31 and the inclined section 32 are configured wherein the widths thereof gradually decrease in a direction toward the hub part 20, and the parallel section 32 has a uniform width and thus contact the inside surface of the recess 21 of the hub part 20.

When the disc part 10 and the hub part 20 are connected through such a structure, combination between the disc part 10 and the hub part 20 may be stably maintained although thermal expansion and thermal stress occurs due to frictional heat during braking.

However, cast iron and an aluminum alloy have different coefficients of thermal expansion and, when heat generated from the disc part 10 is transmitted to the hub part 20 and thus the disc part 10 momentarily contracts and the hub part 20 expands, stick-slip occurs due to stress between the disc part 10 and the hub part 20, thus generating noise.

Since stick-slip is increased in proportion to exciting force determined by stress (N)×difference of coefficients of friction {static friction coefficient ($\mu_s$)–dynamic friction coefficient ($\mu_k$)} and thereby noise is increased, to reduce such noise, stress between the disc part and the hub part should be reduced.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a brake disc which may reduce noise generated due to stick-slip.

In accordance with an aspect of the present invention, the above and other objects can be accomplished by the provision of a brake disc for vehicles, including a ring-shaped disc part provided with an insertion space formed at the central region thereof, a hub part disposed within the insertion space and provided with recesses formed on the outside circumferential surface thereof, and connection parts configured to connect the disc part and the hub part, wherein each of the connection parts is divided into a curved section extending from the inside circumferential surface of the disc part and having both curved side surfaces and a rectilinear section extending from the curved section, having both flat side surfaces and inserted into each of the recess, and widths of the curved section and the rectilinear section are gradually decreased in a direction toward the hub part.

A distance between the connection part and an intersecting point of virtual extending lines of both side surfaces of the rectilinear section may be greater than a distance between the connection part and a central point of the hub part.

A contact point between the curved section and the rectilinear section may serve as a start point of the rectilinear section and the rectilinear section may satisfy Equation 1 below.

$$0.2 \leq R/L \leq 1 \qquad \text{[Equation 1]}$$

(Here, R may indicate a distance between the central point of the hub part and the start point of the rectilinear section, and L may indicate a distance between the intersecting point of the virtual extending lines of both side surfaces of the rectilinear section and the start point of the rectilinear section.)

Both side surfaces of the curved section may be concave so that the width of the curved section is more gently decreased in a direction from the disc part to the hub part.

Both side surfaces of each of the recesses may be inclined to form an angle coinciding with an angle formed by both side surfaces of the rectilinear section.

Coupling stress in the horizontal direction between each of the recesses of the hub part and the rectilinear section of each of the connection parts may be approximately 20-350 MPa.

No separate section having a uniform width may be formed between the curved section and the rectilinear section of each of the connection parts.

The disc part may be formed of cast iron, and the hub part may be formed of an aluminum alloy.

The methods and apparatuses of the present invention have other features and advantages which will be apparent from or are set forth in more detail in the accompanying drawings, which are incorporated herein, and the following Detailed Description, which together server to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention through the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Technical terms used in the following description serve only to describe specific embodiments and are not intended to restrict the invention. In addition, it will be understood that singular expressions used in the following description include plural expressions unless stated otherwise. The term "including" used in the following description will be interpreted as indicating presence of a specific feature, region, number, step, operation, element and/or component, and does not exclude presence of other features, regions, numbers, steps, operations, elements, components and/or groups.

All terms including technical terms and scientific terms used in the following description may have meanings which are generally understood by those skilled in the art, unless stated otherwise. In addition, terms defined in generally used dictionaries are interpreted as having meanings coinciding with related technical documents and the disclosure of the present invention, and are not interpreted as having ideal or excessively formal meanings, unless defined otherwise.

Hereinafter, a brake disc in accordance with an exemplary embodiment of the present invention will be described with reference to the accompanying drawings.

Figure 3:
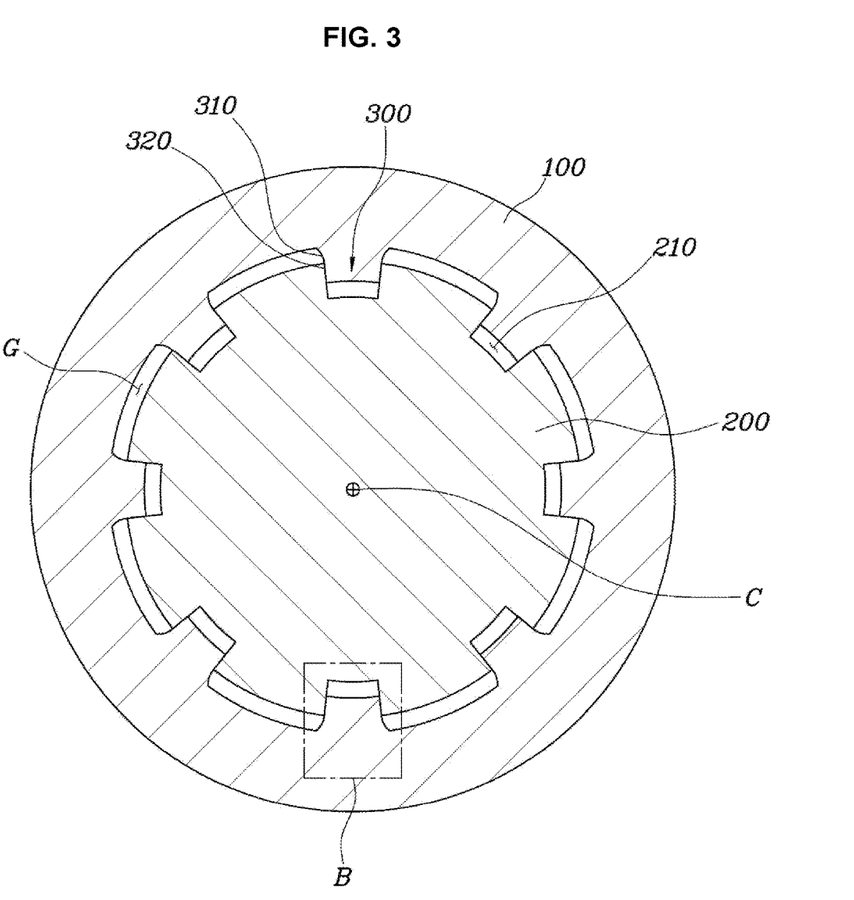
FIG. 3 is a cross-sectional view of a brake disc in accordance with an exemplary embodiment of the present invention.
Figure 4:
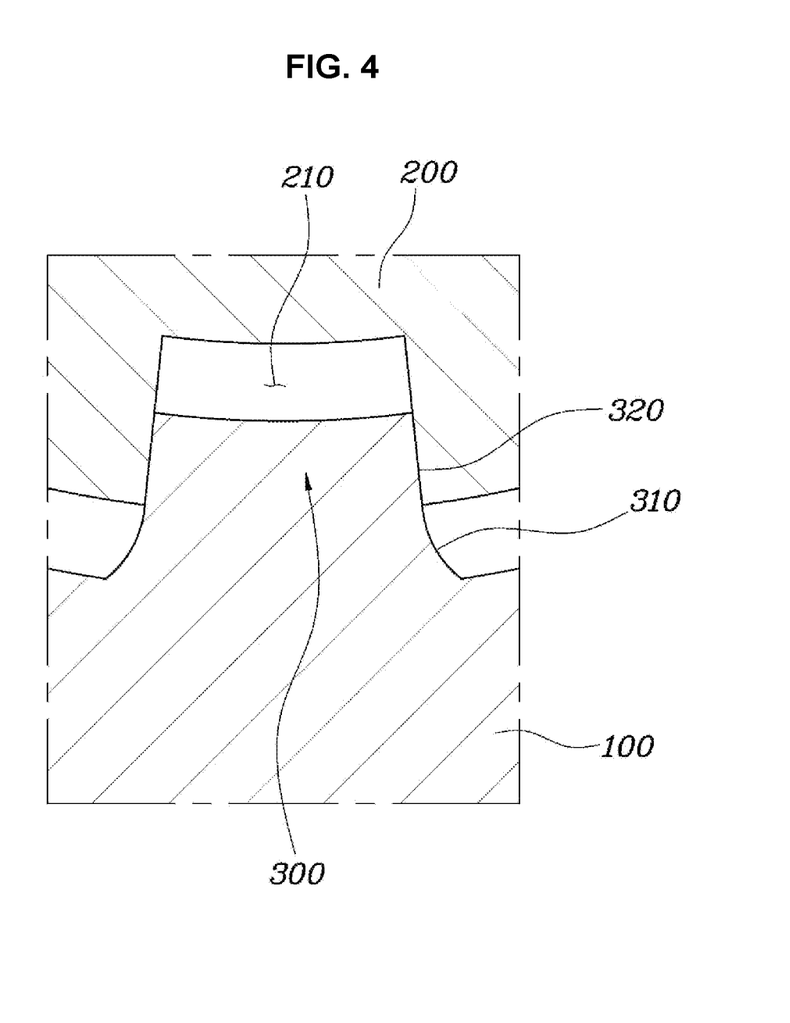
FIG. 4 is an enlarged cross-sectional view of a portion B of the brake disc in accordance with an exemplary embodiment of the present invention.

With reference to FIG. 3 and FIG. 4, a brake disc in accordance with the present invention includes a disc part 100, a hub part 200 and connection parts 300.

The disc part 100 contacts a friction material, converts kinetic energy into thermal energy through friction, and thus brakes a vehicle. The disc part 100 may be formed of cast iron having high heat resistance and abrasion resistance.

The disc part 100 is formed in a disc shape and a through hole is formed at the central portion of the disc part 100 in the thickness direction wherein the hub part 200, which will be described later, is disposed within the through hole. That is, the friction material contacts the upper or lower surface of the disc part 100, and the hub part 200 is disposed within a space formed by the inside circumference of the disc part 100.

The hub part 200 is disposed to be rotated integrally with a wheel and a drive shaft of the vehicle. For the present purpose, a structure which may be connected to the wheel or the drive shaft along a central point C of the hub part 200 may be formed.

The disc part 100 and the hub part 200 are similar to those of a conventional brake disc and a detailed description of the functions thereof will thus be omitted.

The connection parts 300 are essential elements of the present invention. In more detail, the connection part 300 is divided into a curved section 310 and a rectilinear section 320 and protrudes from the inside circumferential surface of the disc part 100, and the end portion of the connection part 300 is inserted into a recess 210 formed on the hub part 200.

Here, the connection parts 300 are configured wherein the width of the connection parts 300 is decreased in a direction from the disc part 100 to the hub part 200.

Both side surfaces of the conventional connection part 30 shown in FIG. 1 and FIG. 2 are divided into three sections, but both side surfaces of the connection part 300 in accordance with the present invention are divided into two sections.

In more detail, the connection part 300 is divided into the curved section 310 and the rectilinear section 320 which are sequentially formed in a direction from the inside circumferential surface of the disc part 100 to the hub part 200, both side surfaces of the curved section 310 are concave so that the decreasing degree of the width of the curved section 310 becomes gradually gentle, and both side surfaces of the rectilinear section 320 are flat so that the decreasing degree of the width of the rectilinear section 320 is uniform.

That is, both side surfaces of the connection part 300 are symmetrical and, in more detail, both side surfaces of the curved section 310 are symmetrical concave surfaces, wherein a cosine curve about the y-axis, and both side surfaces of the rectilinear section 320 are flat surfaces extending at a final angle formed by the end portion of the curved section 310.

It is important to exclude a section having a fixed width between the curved section 310 and the rectilinear section 320, like the conventional parallel section 32 (in FIG. 2). That is, when a section having a fixed width of the connection part 300 is inserted into the recess 210, coupling stress is excessively increased and thus noise due to stick-slip is generated.

Therefore, the connection parts 300 in accordance with the present invention are configured wherein the widths of both the curved section 310 and the rectilinear section 320 are gradually decreased.

The curved surface radius, length, etc. of the curved section 310 of the connection part 300 may be varied according to the size of a gap G between the disc part 100 and the hub part 200, the entire size of the brake disc, etc.

At the angle formed by the rectilinear section 320 of the connection part 300, a point, at which virtual lines extending from both side surface of the rectilinear section 320 of the connection part 300 in the direction to the hub part 200 intersect, may coincide with a central point of the hub part 200 or be located at a position longer than the central point of the hub part 200 from the connection part 300.

Figure 5:
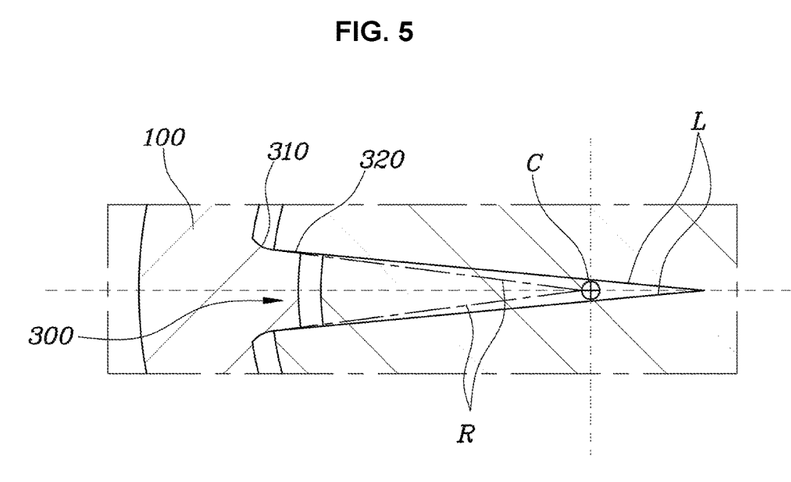
FIG. 5 is a view illustrating an angle formed by both side surfaces of a rectilinear section of the brake disc in accordance with an exemplary embodiment of the present invention.

That is, as exemplarily shown in FIG. 4 and FIG. 5, a point at which virtual lines extending from both side surfaces of the rectilinear section 320 intersect may coincide with the central point C of the hub part 200, or a separation distance between the connection part 300 and such an intersection point is longer than a distance from the connection part 300 to the central point C of the hub part 200.

In more detail, the length of the lines extending from starting points of both side surfaces of the rectilinear section 320, i.e., points of both side surfaces of the rectilinear section 320 contacting the curved section 310, and the length of virtual lines R connecting the starting points of both side surfaces of the rectilinear section 320 to the central point C of the hub part 200 should satisfy Equation 1 below.

$$0.2 \leq R/L \leq 1 \quad \text{[Equation 1]}$$

Hereinafter, Table 1 below represents measured results of coupling forces and mean stresses between disc parts 100 and hub parts 200 of brake discs manufactured in accordance with e examples of the present invention and brake discs manufactured in accordance with Comparative examples deviating from the range of the present invention.

TABLE 1

| | Length of parallel section (mm) | Offset (R/L) | Coupling force (kgf) | | Mean stress (MPs) | |
|---|---|---|---|---|---|---|
| | | | Vertical | Horizontal | Vertical | Horizontal |
| Comparative example 1 | 5.5 | 0 | 2782 | 3530 | 105 | 403 |
| Comparative example 2 | 0 | 1.11 | 1783 | — | 68 | — |
| Comparative example 3 | 0 | 0.13 | 2526 | 3401 | 97 | 388 |
| Experimental example 1 | 0 | 1 | 1839 | 240 | 70 | 28 |
| Experimental example 2 | 0 | 0.91 | 1908 | 638 | 73 | 74 |
| Experimental example 3 | 0 | 0.27 | 2006 | 1265 | 76 | 146 |
| Experimental example 4 | 0 | 0.40 | 2222 | 2677 | 85 | 305 |

In the conventional brake disc of Comparative example 1, which is shown in FIG. 1 and FIG. 2, both side surfaces of the connection part are divided into three sections and, among the three sections, the parallel section 32 has a length of 5.5 mm and is inserted into the recess 21.

Both coupling force and mean stress between the disc part 100 and the hub part 200 of the conventional brake disc of Comparative example 1 are measured as high values and thus the disc part 100 and the hub part 200 may be firmly coupled, but noise due to stick-slip is generated.

In a brake disc of Comparative example 2, a parallel section is omitted, but an offset value determined by the above-described Equation 1 exceeds 1. Such an offset value means that an angle formed by both side surfaces of a rectilinear section 320 is great, i.e., a distance from a connection part 300 to a point at which extending lines of both side surfaces of the rectilinear section 320 intersect is shorter than a distance from the connection part 300 to the central point C of a hub part 200.

Both coupling force and mean stress between the disc part 100 and the hub part 200 of the brake disc of Comparative example 2 are greatly reduced and thus stick-slip does not occur, but coupling strength between the disc part 100 and the hub part 200 is excessively low, the connection part 200 is separated from the recess 210 of the hub part 200 and thus coupling force and mean stress in the horizontal direction between the disc part 100 and the hub part 200 cannot be measured.

In a brake disc of Comparative example 3, a parallel section is omitted, but an offset value determined by the above-described Equation 1 is below 0.2. Such an offset value means that an angle formed by both side surfaces of a rectilinear section 320 is small, i.e., both side surfaces of the rectilinear section 320 are formed almost in parallel.

Coupling strength between the disc part 100 and the hub part 200 of the brake disc of Comparative example 3 is fine, but coupling force and mean stress between the disc part 100 and the hub part 200 of the brake disc of Comparative example 3 are not much different from those of Comparative example 1 and thus noise due to stick-slip is still generated.

On the other hand, in the brake discs of Experimental examples 1 to 4 of the present invention, a parallel section is omitted, but offset values determined by the above-described Equation 1 are within the range of 0.2-1 and thus exhibit lower coupling force and mean stress than those of the brake discs of Comparative examples 1 and 3 and suppress noise generation and solve release of coupling between the disc part 100 and the hub part 200 as in Comparative example 2.

To maintain stable coupling between the disc part 100 and the hub part 200 while suppressing noise due to stick-slip, mean stress in the horizontal direction between the recess 210 of the hub part 200 and the rectilinear section 320 of the connection part 300 should be within the range of 20-350 MPa. Further, an angle formed by both side surfaces of the rectilinear section 320 and an angle formed by both side surfaces of the recess 210 may coincide with each other so that the rectilinear section 320 may be closely adhered to the recess 210.

Although FIG. 5 illustrates the connection part 300, the central point C and a point at which the extending lines L of both side surfaces of the rectilinear section 320 intersect as being located collinearly, the invention is not limited thereto and the point at which the extending lines L of both side surfaces of the rectilinear section 320 intersect may deviate from a line connecting the connection part 300 and the central point C.

That is, both side surfaces of the rectilinear section 320 may not be completely symmetrical to each other and, consequently, the lengths of a pair of lines L extending from both side surfaces of the rectilinear section 320 may be different. Here, the lengths of the respective extending lines L and the lengths of corresponding virtual lines R should satisfy the above-described offset (R/L) range.

As is apparent from the above description, a brake disc in accordance with the present invention has effects, below.

First, the brake disc in accordance with the present invention may reduce stick-slip generated from coupling parts between different kinds of materials, thus suppressing noise generation.

Second, the brake disc in accordance with the present invention may reduce contact stress to suppress noise generation and maintain a coupling state between a disc part and a hub part.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by Claims appended hereto and their equivalents.

What is claimed is:

1. A brake disc for vehicles, the brake disc comprising:
   a ring-shaped disc part provided with an insertion space formed at a central region thereof;
   a hub part disposed within the insertion space and provided with recesses formed on an external circumferential surface thereof; and
   connection parts configured to connect the disc part and the hub part,
   wherein each of the connection parts is divided into a curved section extending from an internal circumferential surface of the disc part and having first and second curved side surfaces and a rectilinear section extending from the curved section, having first and second flat side surfaces and inserted into each of the recesses, and widths of the curved section and the rectilinear section are decreased in a direction toward the hub part, and
   wherein a distance between each connection part and an intersecting point of virtual extending lines of the first and second flat side surfaces of the rectilinear section is greater than a distance between each connection part and a central point of the hub part.

2. The brake disc according to claim 1, wherein a contact point between the curved section and the rectilinear section serves as a start point of the rectilinear section and the rectilinear section satisfies Equation 1 below, $$0.2 \leq R/L \leq 1,$$ [Equation 1]

wherein R indicates a distance between the central point of the hub part and the start point of the rectilinear section, and L indicates a distance between the intersecting point of the virtual extending lines of the first and second flat side surfaces of the rectilinear section and the start point of the rectilinear section.

3. The brake disc according to claim 1, wherein the first and second side surfaces of the curved section are concave and wherein a gradient of a width of the curved section is reduced in a direction from the disc part to the hub part.

4. The brake disc according to claim 1, wherein first and second side surfaces of each of the recesses are inclined to form an angle coinciding with an angle formed by the first and second side surfaces of the rectilinear section.

5. The brake disc according to claim 1, wherein coupling stress in a horizontal direction between each of the recesses of the hub part and the rectilinear section of each of the connection parts is 20-350 MPa.

6. The brake disc according to claim 1, wherein no separate section having a uniform width is formed between the curved section and the rectilinear section of each of the connection parts.

7. The brake disc according to claim 1, wherein the disc part is formed of cast iron and the hub part is formed of an aluminum alloy.

* * * * *